United States Patent [19]
Roberts et al.

[11] Patent Number: 6,009,075
[45] Date of Patent: Dec. 28, 1999

[54] TRANSPORT INTERFACE FOR PERFORMING PROTECTION SWITCHING OF TELECOMMUNICATIONS TRAFFIC

[75] Inventors: Martin Roberts, Milton Keynes, United Kingdom; Thomas A. Potter, Petaluma; R. Douglas Howson, Jr., Santa Rosa, both of Calif.

[73] Assignee: DSC Communications Corporation, Plano, Tex.

[21] Appl. No.: 08/625,801

[22] Filed: Mar. 29, 1996

[51] Int. Cl.⁶ .................................................. H04L 12/24
[52] U.S. Cl. .......................... 370/219; 370/250; 370/359; 370/360; 370/476; 370/907
[58] Field of Search .................... 370/222, 223, 370/224, 225, 226, 227, 228, 359, 360, 216–221, 241, 244, 248–250, 419, 420, 438, 463, 439, 9, 907, 475; 340/825.01, 825.05, 825.06, 825.07, 827; 395/181, 182.01, 182.02

[56] References Cited

U.S. PATENT DOCUMENTS

| | | | |
|---|---|---|---|
| 5,265,096 | 11/1993 | Parruck | 370/216 |
| 5,307,353 | 4/1994 | Yamashita et al. | 395/182.02 |
| 5,343,464 | 8/1994 | Iino et al. | 370/227 |
| 5,365,510 | 11/1994 | Nicholson et al. | 370/222 |
| 5,508,997 | 4/1996 | Katou | 370/228 |
| 5,568,300 | 10/1996 | Ishibashi | 359/137 |
| 5,574,718 | 11/1996 | Eckhoff et al. | 370/228 |

FOREIGN PATENT DOCUMENTS 0570882  11/1993  European Pat. Off. ....... H04Q 11/04
0696111   2/1996  European Pat. Off. .......... H04B 1/74

OTHER PUBLICATIONS

Search Report, PCT/US/97/05286, Jul. 25, 1997.

*Primary Examiner*—Douglas W. Olms
*Assistant Examiner*—Seema S. Rao
*Attorney, Agent, or Firm*—Baker & Botts, L.L.P.

[57] ABSTRACT

A transport interface (10) provides add drop multiplex functionality and termination requirements for the transportation of network traffic. The transport interface (10) includes high speed units (12), broadband interfaces (16), and SONET formatters (18). Each high speed unit (12), broadband interface (16), and SONET formatter has redundant protection pairs (A and B). The high speed units (12), broadband interfaces (16), and SONET formatters (18) communicate with each other by in-band datalinks (40). The redundant protection pairs (A and B) communicate with one another by protection pair datalinks (42). The in-band datalinks (40) and the protection pair datalinks (42) provide an effective means for performing protection switching within the transport interface (10) in the event of component failure. The in-band datalinks (40) are generated out of available or consumed bytes within either a section overhead (32) or a line overhead (34) of SONET OC-N frame (30). The protection pair datalinks (42) provide communication capability over a common control communications interface. The in-band datalinks (40) and the protection pair data links (42) work together to provide a smooth transition from one component to another in the event of a protection switch.

13 Claims, 4 Drawing Sheets

- - - → PATH NOT CARRYING TRAFFIC
——→ PATH CARRYING TRAFFIC

——→ PATH NOT CARRYING TRAFFIC
- - - → PATH CARRYING TRAFFIC

- - - → PATH NOT CARRYING TRAFFIC
——→ PATH CARRYING TRAFFIC 6,009,075

TRANSPORT INTERFACE FOR PERFORMING PROTECTION SWITCHING OF TELECOMMUNICATIONS TRAFFIC

TECHNICAL FIELD OF THE INVENTION

The present invention relates in general to telecommunication information transportation and more particularly to a transport interface for performing protection switching of telecommunications traffic.

BACKGROUND OF THE INVENTION

In SONET based add drop multiplex telecommunication equipment, it is common to have a transport system composed of multiple printed circuit assemblies requiring a variety of hard wired signaling communication channels between assemblies. Popular uses of hard wired interassembly signaling communications include card provisioning, status checking, performance monitoring, and protection switching. Hard wired signaling communication connections increase the expense and size of the assemblies and the transport system. Therefore, it is desirable to reduce the necessity of hard wired signaling communications connections in a transport system of a telecommunications network.

SUMMARY OF THE INVENTION

From the foregoing, it may be appreciated that a need has arisen for a transport system in a telecommunications network that is less dependent on hard wired signaling communication connections among its various components. In accordance with the present invention, a transport interface for performing protection switching of telecommunications traffic is provided that substantially eliminates or reduces disadvantages and problems associated with conventional add drop multiplex telecommunication equipment.

According to an embodiment of the present invention, there is provided a transport interface for performing protection switching of telecommunications traffic that includes first and second high speed unit pairs where each of the first and second high speed unit pairs have a main unit and a protection unit coupled to each other by first and second protection pair datalinks. The first and second high speed unit pairs are coupled together by a first in-band datalink. A broadband interface pair couples to the first and second high speed unit pairs by second and third in-band datalinks. The broadband interface pair includes a main unit and a protection unit coupled to each other by a second protection pair datalink. A SONET formatter pair is coupled to the first and second high speed unit pairs by fourth and fifth in-band datalinks. The SONET formatter pair includes a main unit and a protection unit. The first, second, third, fourth, and fifth in-band datalinks provide protection switching status and processor operability status for the first and second high speed unit pairs, the broadband interface pair, and the SONET formatter pair in conjunction with the various protection pair datalinks.

The present invention provides various technical advantages over conventional add drop multiplex telecommunication equipment. For example, one technical advantage is to eliminate a need for dedicated hard wired signaling communication connections. Another technical advantage is to provide protection switching signaling over unused portions of frame overhead. Yet another technical advantage is to provide each component in a transport interface with status information concerning the operability of all other components. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings wherein like reference numerals represent like parts, in which.

DETAILED DESCRIPTION OF THE INVENTION

Figure 1:
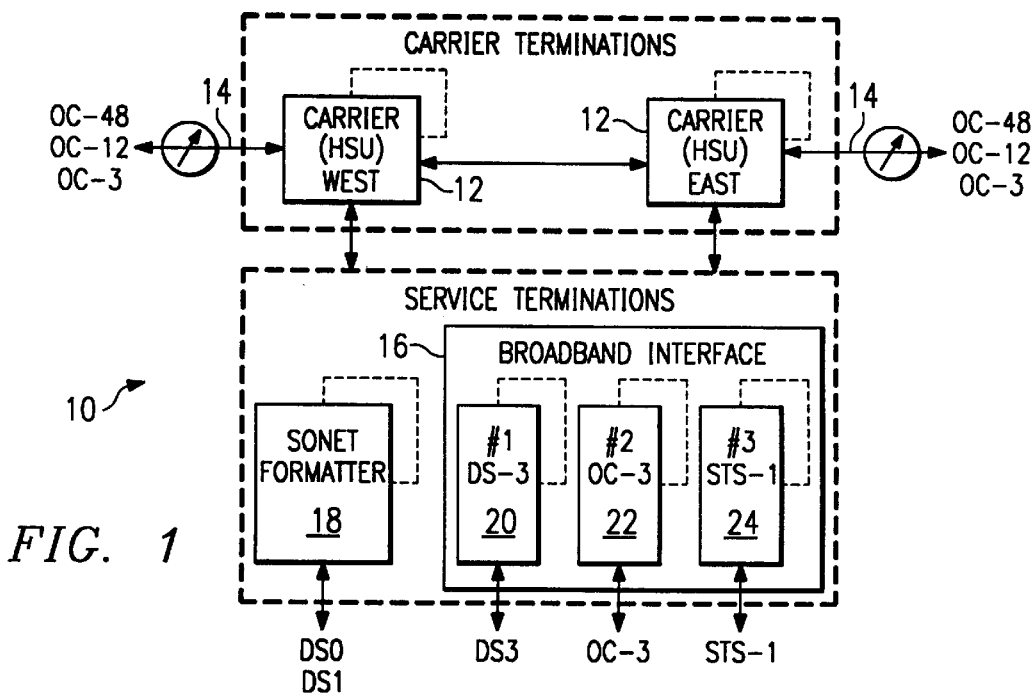
FIG. 1 illustrates a block diagram of a transport interface used in a telecommunication network.

FIG. 1 shows a block diagram of a transport interface 10 for use in a telecommunications network. Transport interface 10 provides appropriate add drop multiplex functionality and termination requirements for the transportation of network traffic. Transport interface 10 includes east and west high speed units 12 that interface with fiber optic connections 14 operating at illustrated example rates of OC-3, OC-12, or OC-48 for carrier terminations. Transport interface 10 also includes a broadband interface 16 and a Synchronous Optical Network (SONET) formatter 18 for service terminations. Broadband interface 16 provides for the transportation of signals at rates higher than wideband DS-1 rates to include DS-3, OC-3, and STS-1 signal rates. SONET formatter 18 provides for the transportation of wideband DS-1 and narrowband DS-0 signals for cross-connection to and from subscribers.

On the receive side, east and west high speed units 12 perform optical to electrical conversion of SONET signals to Synchronous Transport Signals, SONET section and line overhead terminations, full Synchronous Transport Signal cross-connections, system timing alignment, and distribution of Synchronous Transport Signals to broadband interface 16, SONET formatter 18, and other high speed units 12. On the transmit side, east and west high speed units 12 perform multiplexing of Synchronous Transport Signals from broadband interface 16, SONET formatter 18, and other high speed units 12. East and west high speed units 12 also provide full Synchronous Transport Signal cross-connections, SONET section and line overhead generation, and electrical to optical conversion of Synchronous Transport Signals to SONET signals. Payload transport typically occurs between east and west high speed units 12 as through traffic and among east and west high speed units 12, broadband interface 16, and SONET formatter 18 as dropped traffic.

Broadband interface 16 performs line termination and origination of DS-3, STS-1, and OC-3 signals. Broadband interface 16 also performs path termination, origination, and performance monitoring of STS-1 paths. Broadband interface 16 is shown with a DS-3 unit 20, an OC-3 unit 22, and an STS-1 unit 24. SONET formatter 18 performs path termination of STS-1 signals, derives constituent Virtual Tributaries, and either pass through or drop Virtual Tributaries on a path by path basis. Virtual Tributaries that are dropped have their path overhead terminated and constituent DS-0 signals are placed onto space busses to the subscribers.

Figure 2:
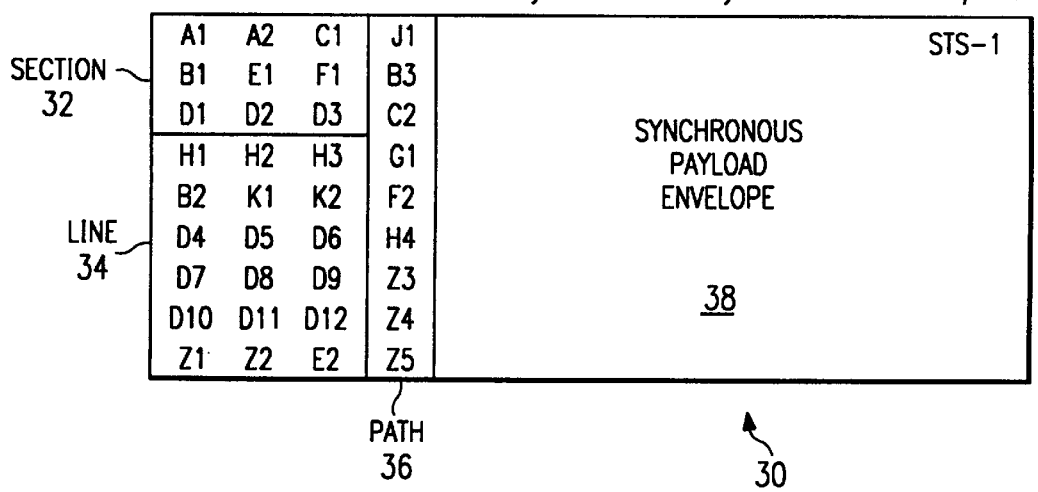
FIG. 2 illustrates a structure for a SONET OC-N frame transported through the transport interface.

FIG. 2 shows a structure of a SONET OC-N frame 30. SONET OC-N frame 30 is a 9 row by 90 column by N phase 125 microsecond frame. SONET OC-N frame 30 includes a section overhead 32, a line overhead 34, a path overhead 36, and a Synchronous Payload Envelope 38. For an OC-3 signal, SONET OC-N frame 30 would be repeated three times for each STS-1 portion of the OC-3 signal in order to provide an STS-3 signal. Section overhead 32, line overhead 34, and path overhead 36 are separated into a plurality of specific bytes to transport signaling information associated with synchronous payload envelope 38. Appendix 1 delineates each signaling byte within SONET OC-N frame 30.

Figure 3:
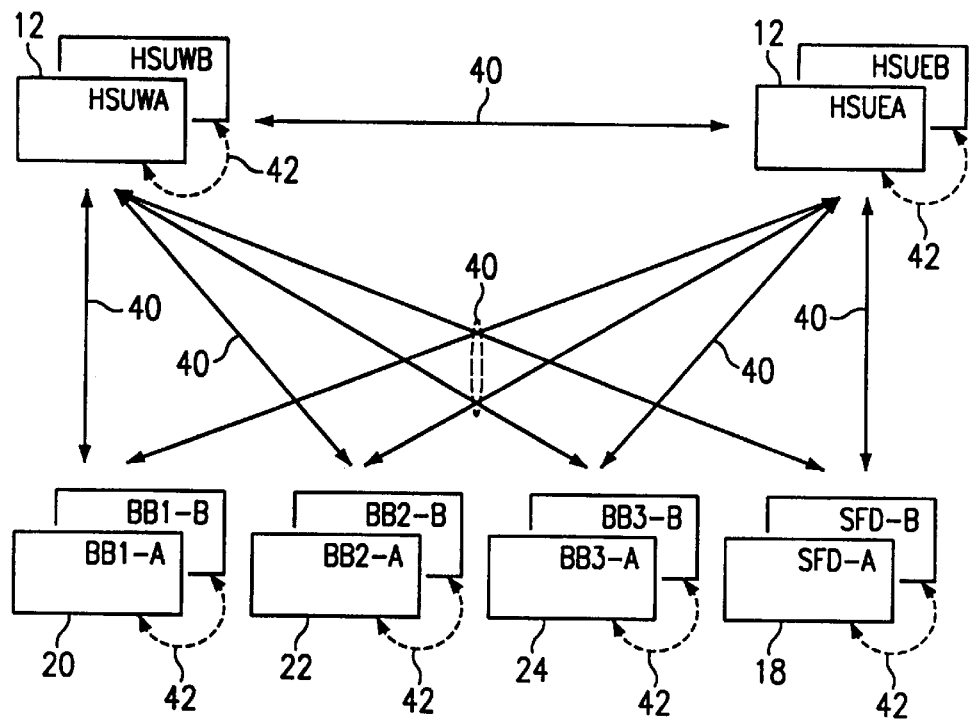
FIG. 3 illustrates a block diagram of communication links between components in the transport interface.

FIG. 3 shows in-band datalinks 40 and protection pair datalinks 42 within transport interface 10 having redundant protection pairs. Each redundant protection pair has two components, a main unit and a protection unit. The main unit is the component that is active at a given point in time. Datalinks allow components within transport interface 10 to communicate among each other. In-band datalinks 40 provide communication capability between redundant protection pairs and every other redundant protection pair within transport interface 10 over a backplane bus interconnection. Protection pair datalinks 42 provide communication capability between redundant protection pair components over a common control communications interface bus. In-band datalinks 40 and protection pair datalinks 42 work together to provide a technique for performing protection switching functions in a bidirectional, as well as a unidirectional, manner. The main and protection units of SONET formatter 18 may not cause their own protection switch and thus may not be coupled by a protection pair datalink 42.

Figure 4A:
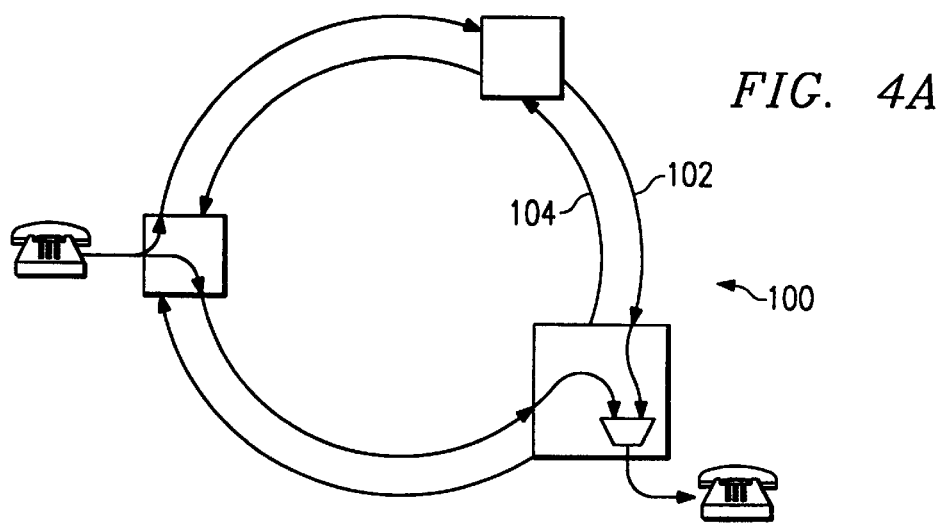
FIGS. 4A–C show examples of protection configurations available in the transport interface.
Figure 4B:
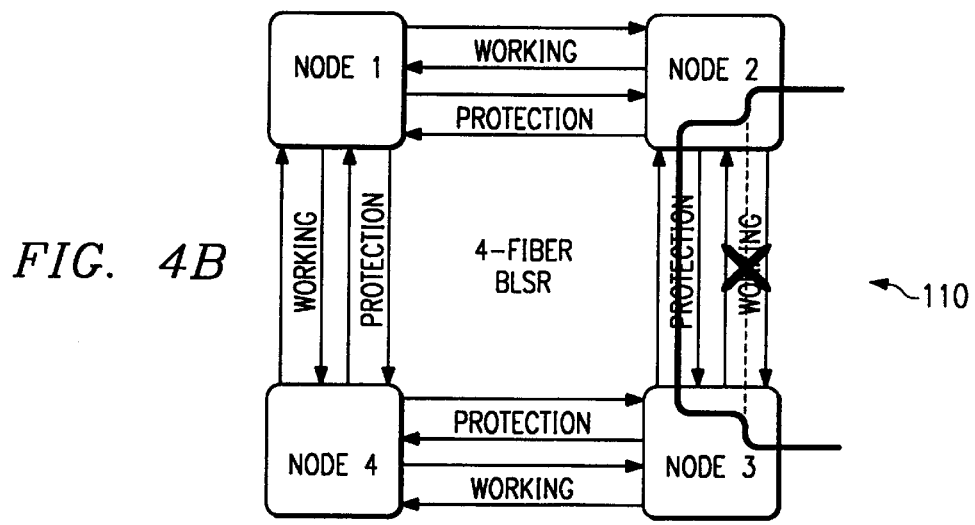
Figure 4C:
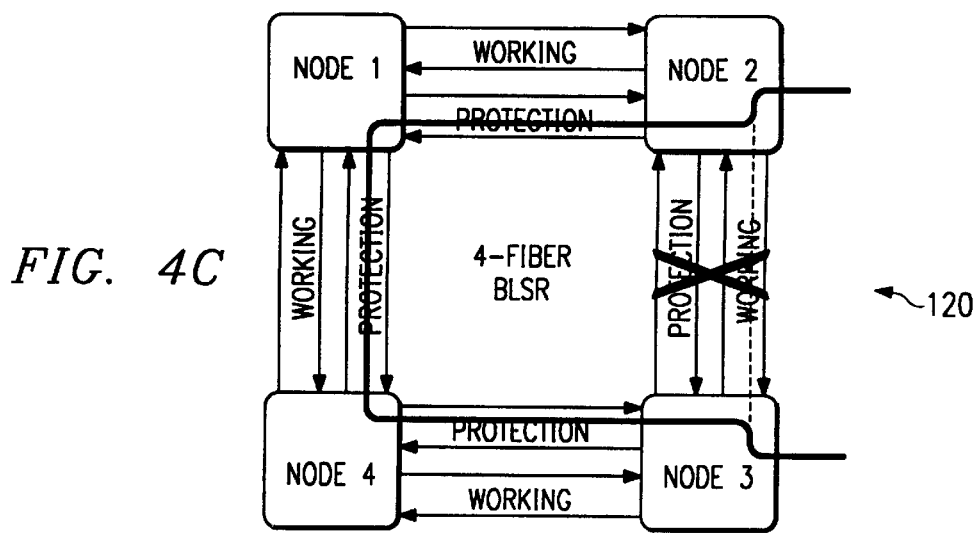

FIGS. 4A–C show the protection ring configurations available in transport interface 10. FIG. 4A shows a unidirectional path switched ring (UPSR) configuration 100. UPSR fiber configuration 100 uses two unidirectional transport rings 102 and 104 coupling separate transport interfaces 10 shown as nodes 1–4. Traffic is inserted and bridged onto both rings and carried simultaneously in each direction. Redundant copies of the traffic are available at the destination from either direction of reception. One copy is selected based on the quality of the received signal.

FIG. 4B shows a 4 fiber bidirectional line switched ring (BLSR) configuration 110 operating as a span switch. Span switching occurs when a failure affects the main connection between two transport interfaces 10. Traffic is switched from the main connection to the protection connection only for that span with no changes made to other span connections between nodes. FIG. 4C shows a 4 fiber BLSR configuration 120 operating as a ring switch. Ring switching occurs when a failure affects both the main and protection connections between two transport interfaces 10. Traffic is looped around and placed on the protection connections and intermediate nodes are placed in a pass through state to allow the traffic to pass through unaltered. Alternatively, a 2 fiber configuration may be used where half the payload is reserved for working traffic and the other half of the payload is used for protection traffic. Span switching would not be available in the 2 fiber configuration.

Figure 5A:
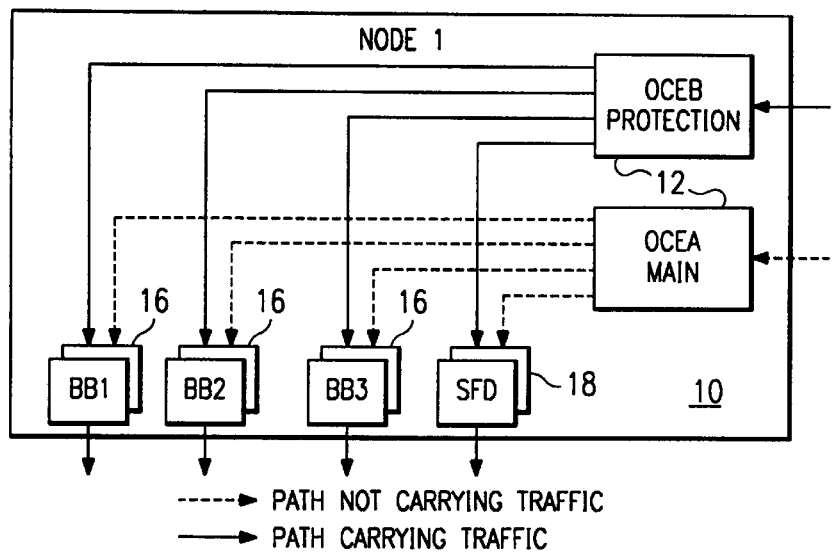
FIGS. 5A–B show examples of span switch and ring switch protection switches of the transport interface.
Figure 5B:
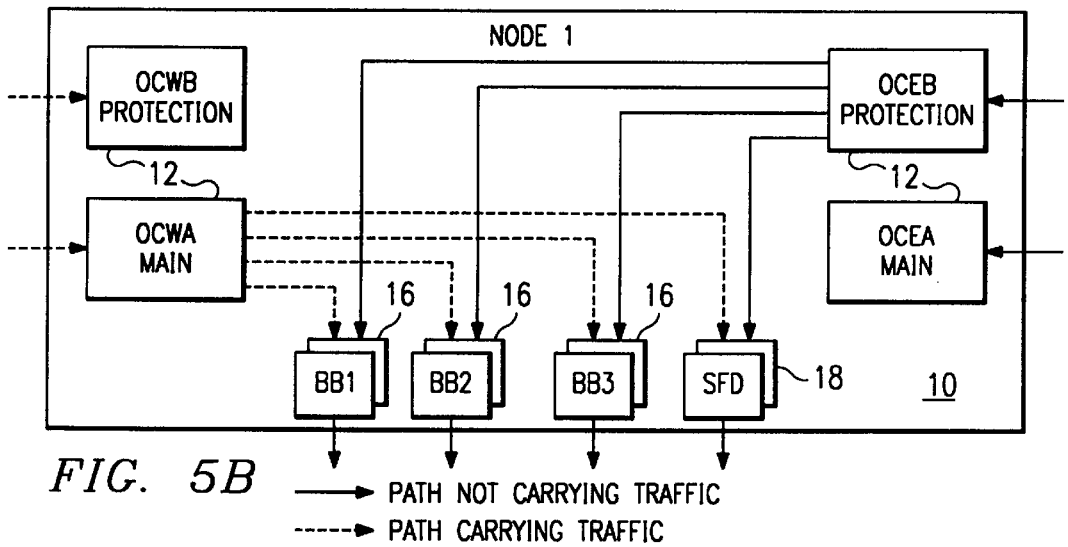

FIGS. 5A–B show examples of how protection switches are performed between main and protection fibers. In FIG. 5A, a span switch is performed from a main unit to a protection unit of east high speed unit 12. The main unit A informs the protection unit B over protection pair datalink 42 that a failure was detected on the main fiber. The protection unit B compares a priority of the detected failure with a current protection switch priority. If the current priority is greater than the detected failure priority, the protection switch is denied. If the protection switch is allowed, protection unit B signals main unit A through protection pair datalink 42 and broadband interfaces 16 and SONET formatter 18 through in-band datalinks 40 to perform the protection switch. Broadband interfaces 16 and SONET formatter 18 select their traffic from protection unit B instead of main unit A. Broadband interfaces 16 and SONET formatter 18 send their new protection status over in-band datalinks 40.

In FIG. 5B a ring switch is performed by looping traffic away from the failure. The main unit A of west high speed unit 12 detects a main fiber failure and sends a message over protection pair datalink 42 to its corresponding protection unit B. Protection unit B also sees a failure and, along with the message from main unit A, determines that a ring switch is necessary. Protection unit B sends a message to broadband interfaces 16, SONET formatter 18, and east high speed unit 12 over appropriate in-band datalinks 40 to request a ring switch. Protection unit B also sends a message to main unit A over its protection pair datalink 42 to inform of the request for a ring switch. Broadband interfaces 16 and SONET formatter 18 switch their received traffic from main unit A of west high speed unit 12 to protection unit B of east high speed unit 12 and broadcast their new protection status over appropriate in-band datalinks 40. Protection unit B of east high speed unit 12 sends out its new state on in-band datalinks 40 and routes outgoing traffic onto its fibers.

Figure 6:
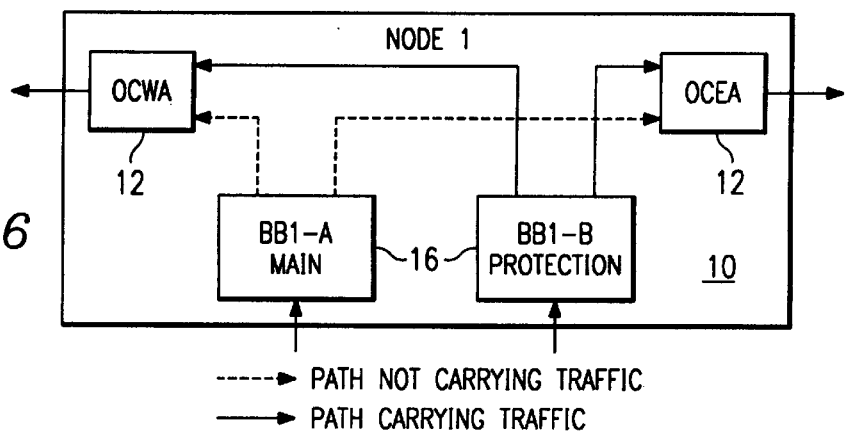
FIG. 6 shows an example of a component protection switch within the transport interface.

FIG. 6 shows an example of a protection switch for a broadband interface 16. The main unit A of broadband interface 16 detects a failure on either the incoming facility or with its own equipment. Main unit A sends a message over its protection pair datalink 42 to its protection unit B to request a switch. Protection unit B determines if the switch should occur based on its status. If the protection switch is allowed, protection unit B sends a message over in-band datalinks 40 to east and west high speed units 12. Protection unit B also sends a message over protection pair datalinks 42 to inform main unit A of the requested switch. East and west high speed units 12 select their traffic from protection unit B instead of main unit A. East and west high speed units 12 send a message indicating their change in protection status to the other components within transport interface 10 over in-band datalinks 12.

In-band datalinks 40 are generated out of available bandwidth in section overhead 32 and line overhead 34 of SONET OC-N frame 30. East and west high speed units 12 terminate section overhead 32 and line overhead 34, consuming multiple byte locations and thus making time slots in the data stream available for use. Specific bytes of section overhead 32 or line overhead 34 can be designated to carry messages containing information concerning the protection capability. The information contained in these messages includes protection switch information that informs other protection pairs which of the protection pair components is being listened to and which protection pair component to listen to. The messages also provide physical and processor status information for feedback on how components within transport interface 10 perceive the operating health of other components and feedback on the functionality of processors on the components.

Table 1 shows an example of a message structure X sent from east or west high speed units 12 to broadband interface 16 and SONET formatter 18. Message structure X in this example is placed into the K1 and K2 bytes of line overhead 34. Bits 0, 1, and 2 of message structure X provide the protection switch information for each broadband interface 16 wherein a zero indicates the A component is selected and a one indicates the B component is selected. Bits 3 and 4 provide the protection switch status and request for east or west high speed unit 12 protection pairs. Bits 5–12 provide the functional status of each component within transport interface 10. Each component may be detected as functional or not present, nonfunctional, or not sane. Bits 13 and 14 provide alternating validation for the processor on the active east or west high speed unit 12 protection pair component. Bit 15 provides the status of the east or west high speed unit 12 protection pair based on the status indicated by protection pair datalink 42.

validation bits swap between 11 and 01 every four milliseconds to show that the processor of the active east or west high speed unit 12 protection pair component is operating properly. The content of message structure 50 is updated during each change of the alternating validation bits. Two consecutive samples of a protection switch information, physical status information, and processor status information are received before such information is considered valid. Each component within transport interface 10 samples in-band datalinks 40 and protection pair datalinks 42 every two milliseconds. If the alternating validation bits do not change or a validated message is not received within a desired time interval, then a failure is reported for the specified component.

Table 2 shows an example of a message structure Y sent from broadband interface 16 and SONET formatter 18 to east or west high speed units 12. Message structure Y in this example is placed into the K1 and K2 bytes of line overhead 34 and of the second STS-1 signal within the STS-3 set. Bits 0 and 1 provide the protection switch information about each high speed unit 12 pair. By providing this information back to high speed units 12, discrepancies in databases between components of transport interface 10 can be determined. Bit 3 provides the switch request and status for the protection pair generating message structure Y. The main unit may source this message directly if the protection unit is not present or not operating. Bits 5–8 provide the status information for each high speed unit 12. This information is helpful in isolating failures within the system and reducing unnecessary protection switches. Bits 9 and 10 provide the status of the selected path when transport interface 10 is

TABLE 1

MESSAGE STRUCTURE X

| K1 byte | | | | | | | | K2 byte | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| PP Stat | PP 1 | PP 0 | SFD B | SFD A | BB3 B | BB3 A | BB2 B | BB2 A | BB1 B | BB1 A | Rng | A/B | BB 3 | BB 2 | BB 1 |

| | |
|---|---|
| Bits 0–2 | Which of the BBX (x = 1, 2, or 3) Protection Pair the HSU is listening to. |
| | 0 - A |
| | 1 - B |
| Bit 3 | Which of the HSUS the drop cards should be listening to. |
| | 0 - A |
| | 1 - B |
| Bit 4 | When set along with a change in state of bit 3, defines a ring switch request. |
| | 1 - Ring Switch Request |
| Bits 5–12 | Status of drop card as seen by HSU. |
| | 1 - Failed |
| Bits 13–14 | Ping-Pong values for processor sanity. Alternate 11 and 01 patterns. |
| | 10 - For future use. |
| | 00 - Holdoff processing IBDL messages (used during upgrades) |
| Bit 15 | Protection Pair Status |
| | 1 - Failed |

Validation of messages sent on in-band datalinks 40 and protection pair datalinks 42 is used to avoid interpreting garbage information as valid protection switch requests. The alternating validation bits provide a technique of checking the processor functionality of a component. The alternating operating in a path protected switched ring configuration. Bits 13 and 14 provide the alternating validation technique for the processor of the component sending message structure Y. Bit 15 provides the status of the protection pair based on the protection pair datalink status. This bit provides a method to evaluate a message from a protection pair when the main and protection units are sending conflicting requests. Bits 2, 4, 11, and 12 are reserved for future use.

TABLE 2

MESSAGE STRUCTURE Y

| K1 byte | | | | | | | | K2 byte | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| PP Stat | PP-1 | PF-0 | Und (0) | Und (0) | P-Sel W | P-Sel E | W B | W A | E B | E A | Und (0) | A/B | Und (0) | W | E |

| | |
|---|---|
| Bits 0–1 | Which of the HSUs the drop cards should be listening to. <br> 0 - A <br> 1 - B |
| Bit 3 | Which of the HSUs the drop cards should be listening to. <br> 0 - A <br> 1 - B |
| Bits 5–8 | Status of HSUs as seen by the drop cards. <br> 1 - Failed |
| Bits 9–10 | Status of dropped paths when in PPS rings configuration <br> 1 - At least one path dropped |
| Bits 13–14 | Ping-Pong values for processor sanity. Alternate 01 and 11 patterns. <br> 10 - For future use. <br> 00 - Holdoff processing IBDL messages (used during upgrades) |
| Bit 15 | Protection Fair Status <br> 1 - Failed |
| Bits 2, 4, 11, 12 | For future use, set to 0. |

Table 3 shows an example of a message structure Z sent from east high speed unit 12 pairs to west high speed unit 12 pairs, or vice versa. Message structure Z in this example is also placed into the K1 and K2 bytes of line overhead 34 of the second STS-1 signal within the STS-3 set. Bit 0 provides the protection switch information for the opposite high speed unit 12 pair. Bits 3 and 4 provide the switch request and status for the high speed unit 12 pair. When the protection high speed unit 12 determines that a protection switch is necessary, bits 3 and 4 will be set to reflect the requested change. Bit 3 indicates which one of the protection pair should be used and bit 4 is set when a ring switch is required while operating in the bidirectional line switched ring configuration. If the protection unit is not present or not operating, then the main unit of the protection pair may source this message directly but only regarding a switch back to itself. Bits 5 and 6 provide the status information of each opposite high speed unit 12. This information is helpful in isolating failures within the system and reducing unnecessary protection switches. Bits 7, 8, and 9 are used only during bidirectional line switched ring configuration operation for requesting appropriate pass through states. Partial K1 and K2 bytes or full K1 and K2 bytes may be sassed through in the APS bytes with the option of also passing through the signal. Bits 13 and 14 provide the alternating validation technique for the processor of the high speed unit 12 that sends message structure Z. Bit 15 provides the status of the protection pair based on the protection pair datalink status. This bit provides a method of evaluating a message from the protection pair when the main and protection units are sending conflicting requests. Bits 1, 2, 10, 11, and 12 are reserved for future use.

TABLE 3

MESSAGE STRUCTURE Z

| K1 byte | | | | | | | | K2 byte | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| PP Stat | PP 1 | PP 0 | Und (0) | Und (0) | Und (0) | Und (0) | Prot Ch | Full K | Part K | Stat B | Stat A | A/B | Und (0) | Und (0) | Rev A/B |

| | |
|---|---|
| Bits 0–1 | Which of the HSUs Protection Pair from the other side this HSU is listening. <br> 0 - A <br> 1 - B |
| Bit 3 | Which of the HSUs the opposite side should be listening to. <br> 0 - A <br> 1 - B |

TABLE 3-continued

MESSAGE STRUCTURE Z

| | |
|---|---|
| Bit 4 | When set along with a change in state of bit 3, defines a ring switch request |
| | 1 - Ring Switch Request |
| Bits 5–6 | Status of HSUs on the opposite side as seen from this HSU. |
| | 1 - Failed |
| Bit 7 | Pass K1 byte and bit 5 of K2 byte through (BLSR only) |
| Bit 8 | Pass Full APS bytes through (BLSR only) |
| Bit 9 | Pass the protection channel through. |
| Bits 13–14 | Ping-Pong values for processor sanity. Alternate 11 and 01 patterns. |
| | 10 - For future use |
| | 00 - Holdoff processing IBDL messages (used during upgrades) |
| Bit 15 | Protection Pair |
| | 1 - Failed |
| Bits 1–2, 10–12 | For future use, set to 0. |

Figure 7:
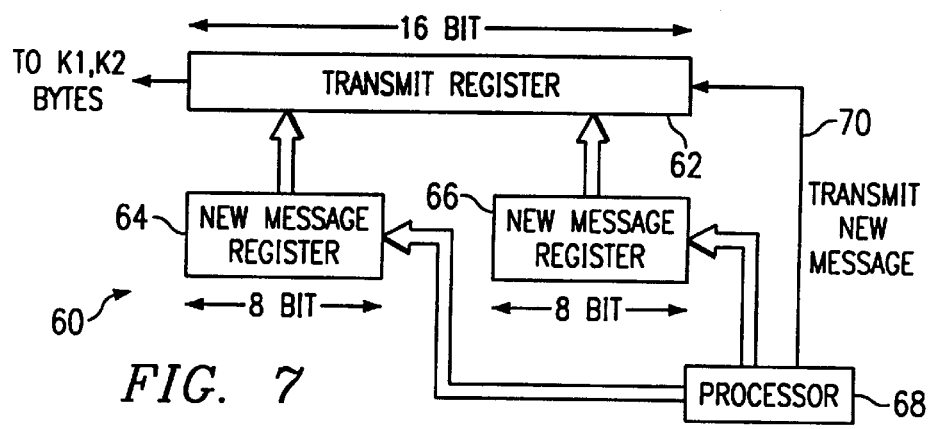
FIG. 7 illustrates an in-band datalink driver to create the message structure.

FIG. 7 shows how messages are placed into the K1 and K2 byte locations of line overhead 34. A message is transmitted continuously until a new message is provisioned. A double buffered in-band datalink driver 60 design used in each component of transport interface 10 provides the means for changing and sending messages. In-band datalink driver 60 includes a 16-bit transmit register 62 that supplies the information to the K1 and K2 byte locations of line overhead 34. Two 8-bit new message registers 64 and 66 are able to receive changes for the K1 and K2 byte locations. A processor 68 of the particular component writes new message information into the two 8-bit new message registers 64 and 66 without affecting the outgoing data from the 16-bit transmit register 62. A transmit new message signal 70 from processor 68 causes information in the two 8-bit new message registers 64 and 66 to be stored into the 16-bit transmit register 62. A message is continuously sent until the next assertion of the transmit new message signal 70.

In-band datalink driver 60 minimizes software timing requirements. Data transfer from transmit register 62 to the K1 and K2 byte timeslots occurs every 125 microseconds. Transmit new message signal 70 causes the load of new data from 8-bit new message registers 64 and 66 into transmit register 62 at the next frame boundary. Transmit new message signal 70 is then cleared until a new data load is desired. The process of storing data into transmit register 62 for placement onto the K1 and K2 byte timeslots may take up to 125 microseconds, corresponding to a frame length and size, to complete.

Table 4 shows an example of a message structure W for protection pair datalink 42. Message structure W is sent in protection pair datalink 42 between a main unit and a protection unit within a protection pair to inform each other that a protection switch is needed. Message structure W works in much the same way as the message structures for in-band datalink 40. Bits 1 and 2 provide the switch request and status for the appropriate unit of the protection pair. Bit 1 indicates the unit in the protection pair that should now be used. Bit 2 is set when a ring switch is required while operating in the bidirectional line switch ring configuration. When the main unit sends message structure W to the protection unit, the message structure must first be evaluated by the protection unit before it is considered valid. If the protection switch request cannot be honored, then the protection unit returns a message that says it received a request to switch to the protection unit but operation is still affective on the main unit. This will cause the main unit to no longer request the switch. If the protection switch request is validated by the protection unit, then it shall send back its change of state to the main unit as well as sending the appropriate in-band datalink message to other components within transport interface 10. Bit 3 provides the status of the other unit of the protection pair. Bits 4 and 5 provide the alternating validation technique for the processor of the unit of the protection pair sending message structure W. Bits 0, 6, and 7 are reserved for future use.

TABLE 4

MESSAGE STRUCTURE W

| B2 BYTE | | | | | | | |
|---|---|---|---|---|---|---|---|
| 7 | 6 | 5 | 4 | 3 | 2 | 1 | 0 |
| Fail-1 | Fail-0 | PP-1 | PP-0 | Rev Fail | Ring | A/B | Rev A/B |

| | |
|---|---|
| Bit 1 | Which card this inember of the protection pair is on. |
| | 0 - A |
| | 1 - B |
| Bit 2 | When set along with a change in state of bit 1, defines a ring switch request. |
| | 1 - Ring Switch Request |
| Bit 3 | Status of the other member of the protection pair that we detect. |
| | 1 - Failed |
| Bits 4–5 | Ping-Pong values for processor sanity. Alternate 11 and 01 patterns. |
| | 10 - For future use |
| | 00 - Holdoff processing IBDL messages (used during upgrades) |
| Bits 0, 6, 7 | Reserved for future use. |

Upon installation of a main or protection unit within transport interface 10, inadvertent protection switching must be avoided when power is applied to a newly installed unit. Once power is applied to a new unit, in-band datalinks 40 and protection pair datalink 42 become active and the unit sends an all zeros message on both datalinks. To the other units within transport interface 10, the message will be received as a failure since the alternating validation bits will not be changing state. As the new unit begins to be provisioned, the message sent on both datalinks is changed to all zeros except for the alternating validation bits which are both set to zero to indicate that the datalinks should be ignored until these bits begin alternating. Once the new unit has been fully provisioned, it begins operation on the datalinks by first checking received information from in-band datalink 40 and protection pair datalink 42. In this manner the unit can determine the protection state of transport interface 10. This information determines what is sourced on both datalinks to allow the new unit to configure itself to the appropriate protection state.

Conflicting messages may occur over in-band datalink 40 and protection pair datalink 42 which fall into three categories - a receiver unit on a datalink is not listening to the same unit as the sender requested, switch requests differ on a datalink between two units in transport interface 10, and status differs between two units and a protection pair. Where a receiver unit is not listening to the same unit as requested by the sending unit, the handling is different between protection pair datalink 42 and in-band datalink 40. On protection pair datalink 42 this situation may arise when a protection unit decides to decline a protection request from the main unit. This would indicate to the main unit that it should no longer state that it is on protection. For all other cases on protection pair datalink 42 and in-band datalink 40, this would indicate that a software or hardware failure has occurred.

When switch requests differ over in-band datalink 40 from two units of transport interface 10, this may indicate the beginning of a switch request or a failure of a unit within transport interface 10. In the case where a switch request has just begun, the switch status in the message structure would differ for less than a predefined validation time out period so both units of transport interface 10 would be sourcing the same protection status. When the switch request exceeds the predefined validation time out period, then that would imply a failure of a unit within transport interface 10. A failure of one unit to talk to another unit within transport interface 10 would be indicated by the protection pair status bit in the message structure of in-band datalink 40. When a receiving unit sees the protection pair status bit set on one of the conflicting messages, then it shall use that message as the true request. This provides a technique for determining when to use a main unit's message over a protection unit's message. If a determination cannot be made based on the above criteria, then no switch shall occur and a failure message will be sent indicating that a software failure occurred and it cannot be isolated.

When a status differs between units of a protection pair, it implies that a failure has occurred either on the backplane or on a device on one of the boards. This failure will be reported with, if possible, a determination where the failure is likely to have originated.

In-band datalinks 40 also provides a local bus monitor function. The local bus monitor message is contained in the K1 and K2 bytes of the third STS-1 signal in the STS-3 set. The local bus monitor is used by other units to determine if a card is present, failed, or absent. The sending unit sends out a recurring pattern, HEX55AA, which is sent on all in-band data links 40. When a receiving detects the pattern as absent, the hardware alerts the software of that fact.

Another use for in-band datalinks 40 is in forwarding path maintenance signals from high speed units 12 to broadband interfaces 16 and SONET formatters 18. Under Bellcores specifications, a Remote Defect Indication (RDI-P) signal is required to be generated by path terminating equipment, such as broadband interfaces 16 and SONET formatters 18 on detection of one of the following defects—Loss of Signal (LOS), Loss of Frame (LOF), Line Alarm Indication (AIS-L), Loss of Pointer (LOP-P), and Path Alarm Indication Signal (AIS-P). LOS, LOF, and AIS-L defects are detected by line terminating equipment, such as high speed units 12. LOP-P and AIS-P defects are detected by path terminating equipment and also by line terminating equipment that contain STS payload pointer interpreters such as east and west high speed units 12. Line terminating equipment must immediately notify downstream path terminating equipment. Typically, defects are forwarded by generating downstream alarm indication signals (AIS-L or AIS-P) on dedicated hardware lines which take at least three 125 microsecond frames before the defect is detected. By using in-band datalinks 40, path maintenance signals containing the status of defects can be placed into consumed bytes of section overhead 32 or line overhead 34 and decoded without the delay normally associated with downstream detection.

Table 5 shows an example of path maintenance signal placement within the B2 byte of line overhead 34. Bit 8 holds the AIS-P defect information for passing to path processing units. Upon AIS-P detection, an all-ones pattern is generated in the appropriate STS payload pointer bytes and all appropriate SPE bytes are overwritten with all-ones. Bit 7 holds the LOP-P defect. Bit 6 holds elastic store overruns forwarded to downstream path processing units. Bit 5 holds a Line Failure signal that is a result of logically ORing the LOS, LOF, and AIS-L defects. The notification of these defects to downstream path terminating equipment provides for the generation of the RDI-P signal. Bit 4 holds an all-ones pointer to ensure that there is no more than one frame of delay in regenerating an all-ones pattern.

TABLE 5

| DEFECT NOTIFICATION MESSAGE | | | | | | | |
|---|---|---|---|---|---|---|---|
| 1 | 2 | 3 | 4 | 5 | 6 | 7 | 8 |
| | | | All-1s Pointer | Line Failure | Elastic Store Overrun | LOP-P | Received AIS-P |

In summary, in-band data links are created through the overhead signaling of a SONET structure between components in a transport interface. Proprietary protection datalinks are established between redundant protection pair components for fault isolation and avoidance purposes.

Thus, it is apparent that there has been provided, in accordance with the present invention, a transport interface for performing protection switching of telecommunication traffic that satisfies the advantages set forth above. Although the present invention has been described in detail, it should be understood that various changes, substitutions, and alterations readily ascertainable by one skilled in the art can be made herein without departing from the spirit and scope of the present invention as defined by the following claims.

APPENDIX 1

| Overhead Byte Definition and Usage | A1, A2 Framing Bytes | B1 Section Parity | C1 Section Trace | D1, D2, D3 Date Communication Channel | E1 Order Wire | F1 User Bytes |
|---|---|---|---|---|---|---|
| SONET SECTION OVERHEAD | Begins each STS-1. | BIP-8, Bit interleaved parity even. Computed from previous STS-N after scrambling. Placed in STS-1 #1 only. | Section Trace (Formerly Section 1D). | Section DCC 7 layer OSI stsck using CMISE message format Used for control, monitor, alarm, and other communication between Section terminating equipment. | Local Voice Channel defined only for STS-1 #1 of an STS-N. Signaling is undefined. | Optional for SONET, defined oniy for STS-1 #1 of an STS-N. |

| Overhead Byte Definition and Usage | B2 Line Parity | D4–D12 Line DCC | E2 Express Orderwire | H1, H2, H3 Payload Pointer | K1, K2 Automatic Protection Switching | Z1 (S1) Synch Status | Z2 (M2) Far End Block Error |
|---|---|---|---|---|---|---|---|
| SONET LINE OVERHEAD | Line BIP-8. Line error monitoring in each STS-1 of an STS-N. Calculated from all line overhead bytes and payload bytes. | Line DCC 7 layer OSI stack using CMISE message format for OAM&P between line tenninating equipments. Defined oniy for STS-1 #1 of an STS-N. | Optional Express orderwire between line equipments. Defined only for STS-1 #1 of an STS-N. | H1 & H2 point to the start of the SPE. H3 used for pointer justification. | Provides Automatic Protection Switching (APS) signaling between line level entities. Defined only for STS-1 #1 of an STS-N. | Used for synchronization status messages (Bits 5–8). | Used for STS-3C and STS-12c. FEBE for B-ISDN. |

| Overhead Byte Definition and Usage | B3 Path Error Monitoring | C2 Signal Label | F2 Path User Channel | G1 Path Ststus | H4 Multiframe indicator | J1 Path Trace | Z3, Z4 Future Growth | Z5 Tandem Monitor |
|---|---|---|---|---|---|---|---|---|
| SONET PATH OVERHEAD | BIP-8 Even Parity | One byte used to identify the construction of the SPE. Any value other than "0" indicates an equipped condition. | User communication between Path elements. | One byte used to indicate the status of the Far End Terminating Equipment. Allows the full duplex Path to be monitored at either end or at any point along the Path. | Multiframe payload indicator. Currently used only for VT structured payloads. | 64 byte fixed length string to verify connection between path transmitting equipment and path receiving equipment. | Growth Byte. | Bits 14 used for incoming error monitoring. Bits 5–8 used as communications channel. |

What is claimed is:

1. A transport interface for performing protection switching of telecommunications traffic, comprising:

first and second high speed unit pairs operable to receive telecommunications traffic from and transmit telecommunications traffic to a telecommunications network, the first and second high speed unit pairs coupled together by a first in-band datalink, each of the first and second high speed unit pairs including a main unit and a protection unit coupled together by a protection pair datalink, respectively;

a broadband interface pair coupled to the first and second high speed unit pairs by second and third in-band datalinks, the broadband interface pair including a main unit and a protection unit coupled together by a protection pair datalink; and a SONET formatter pair coupled to the first and second high speed unit pairs by fourth and fifth in-band datalinks, the SONET formatter pair including a main unit and a protection unit which are not coupled by a protection pair datalink in order that the SONET formatter pair does not cause its own protection switch, wherein each protection pair datalink carries a message to inform associated main and protection units when a protection switch is required, each protection pair datalink being implemented in time slots of a common control communications interface bus, and wherein each in-band datalink carries an associated message to inform each pair of required/requested protection switches, protection status, and associated processor operability, each in-band datalink being implemented in frames carrying telecommunications traffic.

2. The transport interface of claim 1, wherein each in-band datalink is implemented in a line overhead of the telecommunications traffic.

3. The transport interface of claim 2, wherein each in-band datalink is implemented in K1 and K2 bytes of the line overhead.

4. The transport interface of claim 1, wherein each protection pair datalink and each in-band datalink continuously sends its associated message until a respective new message is provisioned.

5. A transport interface for performing protection switching of telecommunications traffic, comprising:

first and second high speed unit pairs operable to receive telecommunications traffic from and transmit telecommunications traffic to a telecommunications network, the first and second high speed unit pairs coupled together by a first in-band datalink, each of the first and second high speed unit pairs including a main unit and a protection unit coupled together by a protection pair datalink, respectively;

a broadband interface pair coupled to the first and second high speed unit pairs by second and third in-band datalinks, the broadband interface pair including a main unit and a protection unit coupled together by a protection pair datalink; and a SONET formatter pair coupled to the first and second high speed unit pairs by fourth and fifth in-band datalinks, the SONET formatter pair including a main unit and a protection unit coupled together by a protection pair datalink, wherein each protection pair datalink carries a message to inform associated main and protection units when a protection switch is required, each protection pair datalink being implemented in time slots of a common control communications interface bus, and wherein each in-band datalink carries an associated message to inform each pair of required/requested protection switches, protection status, and associated processor operability, each in-band datalink being implemented in frames carrying telecommunications traffic, wherein each in-band datalink carries processor bits in its associated message, the processor bits alternating between a first state and a second state to indicate valid associated processor operability, wherein an associated processor is determined to be inoperable when the processor bits are not alternating between the first state and the second state.

6. The transport interface of claim 5, wherein each main unit and protection unit samples its associated protection pair datalink and in-band datalink at a first clock rate, the protection bits alternating at half the first clock rate.

7. The transport interface of claim 6, wherein associated messages on each protection pair datalink and each in-band datalink are valid after two consecutive identical samples are obtained by the main and protection units.

8. The transport interface of claim 1, wherein each in-band datalink provides a local traffic bus monitor function to determine a presence or failure status of traffic busses between associated main and protection units through the associated messages, the associated messages including a recurring bit pattern transmitted by a sending main or protection unit that is monitored by a receiving main or protection unit, absence of the recurring bit pattern indicating a traffic bus failure between sending and receiving main and protection units.

9. The transport interface of claim 8, wherein the recurring bit pattern is placed into K1 and K2 bytes of a line overhead of the telecommunication traffic.

10. The transport interface of claim 1, wherein each in-band datalink provides a defect notification function.

11. A method of performing protection switching of telecommunication traffic, comprising the steps of:

generating a protection switch message indicating protection status and switch request information for the telecommunications traffic, the protection switch message providing an indication of whether a main or protection unit is in an active state, the protection switch message providing an indication of whether the active state is to be changed between the main and protection unit, the protection switch message including a local traffic bus monitor function to determine a presence of traffic buses between main and protection unit pairs, the local traffic bus monitor function being implemented as a recurring bit pattern wherein an absence of the recurring bit pattern indicates a failure in a traffic bus;

placing the protection switch message in available overhead bytes of the telecommunications traffic; and transporting the protection switch message within the telecommunications traffic.

12. A method of performing protection switching of telecommunication traffic, comprising the steps of:

generating a protection switch message indicating protection status and switch request information for the telecommunications traffic;

placing the protection switch message in available overhead bytes of the telecommunications traffic;

transporting the protection switch message within the telecommunications traffic;

alternating processor validation bits within the protection switch message between a first state and a second state, the alternating processor validation bits indicating a valid operation of a processor associated with the processor validation bits.

13. The method of claim 11, wherein the protection switch message is placed in K1 and K2 bytes of line overhead of a SONET frame carrying the telecommunications traffic.

* * * * *